United States Patent [19]
Hayashi et al.

[11] Patent Number: 4,785,326
[45] Date of Patent: Nov. 15, 1988

[54] TABLE START POSITION SELECTING MECHANISM FOR ELECTROPHOTOGRAPHIC COPYING MACHINE

[75] Inventors: Tatsushi Hayashi, Nara; Eiichi Shimizu, Yamatokoriyama; Tamami Handa, Nara, all of Japan

[73] Assignee: Sharp Kabushiki Kaisha, Osaka, Japan

[21] Appl. No.: 905,866

[22] Filed: Sep. 10, 1986

[30] Foreign Application Priority Data

Sep. 17, 1985 [JP] Japan .......................... 60-141809[U]

[51] Int. Cl.[4] ...................... G03B 27/48; G03B 27/50; G03B 27/70

[52] U.S. Cl. .......................................... 355/8; 355/51; 355/75

[58] Field of Search .................. 355/8, 50, 75, 51, 57; 200/61.41, 61.42

[56] References Cited

U.S. PATENT DOCUMENTS

| | | | |
|---|---|---|---|
| 3,421,816 | 1/1969 | Robertson et al. | 355/8 |
| 3,594,079 | 7/1971 | Murgas et al. | 355/8 |
| 3,598,489 | 8/1971 | Thomas et al. | 355/51 |
| 3,669,535 | 6/1972 | Hyosaka et al. | 355/8 |
| 3,950,090 | 4/1976 | Washio et al. | 355/51 X |
| 4,190,358 | 2/1980 | Sasuga | 355/75 |
| 4,375,019 | 2/1983 | Yoshida | 200/61.42 X |
| 4,682,884 | 7/1987 | Taniguchi et al. | 355/8 X |

*Primary Examiner*—Patrick R. Salce
*Assistant Examiner*—Emanuel Todd Voeltz
*Attorney, Agent, or Firm*—Flehr, Hohbach, Test, Albritton & Herbert

[57] ABSTRACT

A table start position selecting mechanism for an electrophotographic copying machine of the type with a movable table comprises a unistructural lamp unit with a lamp and a primary mirror for initially reflecting light from a document on the table. A table start position detection switch is attached to a supporting plate which is independent of the lamp unit and adjustable with respect thereto in the direction of motion of the table. A positioning device such as a pin is affixed to the lamp unit at the center of its optical axis such that the switch-supporting plate can be easily and accurately positioned with respect to the lamp unit in the direction of motion of the table.

5 Claims, 2 Drawing Sheets

TABLE START POSITION SELECTING MECHANISM FOR ELECTROPHOTOGRAPHIC COPYING MACHINE

This invention relates to a mechanism for selecting the position at which the motion of the table starts in an electrophotographic copying machine of the type with a movable table and more particularly to such a mechanism having a unistructural lamp unit with a lamp and a mirror which can be adjusted for fine corrections of the optical system of the copying machine.

Figure 2:
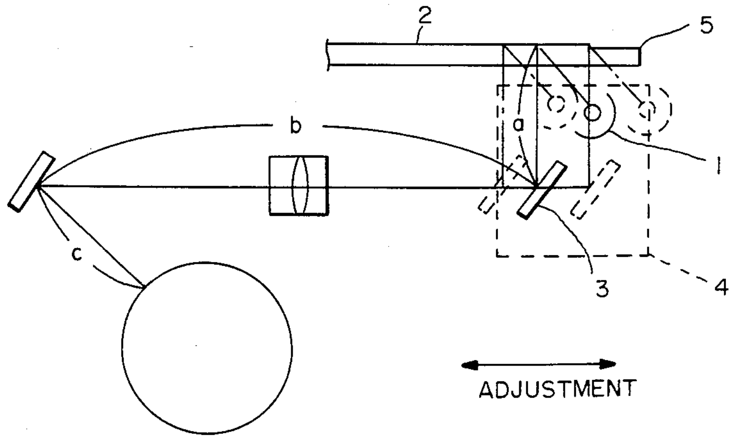

In the optical system for an electrophotographic copying machine, the optical path length between the surfaces of a document to be copies and the photosensitive drum (distance between conjugate foci) must be adjusted accurately. There are variations, however, in the characteristics of mass-produced lenses and variations on the order of ±1.0% are common among ordinary copying machines. In view of the above, use has been made of mechanism such as shown in FIG. 2 and disclosed, for example, in U.S. patent application Ser. No. 806,491 filed Dec. 9, 1985 and assigned to the present assignee, to eliminate the effects of variations in optical systems. With reference to FIG. 2, a lamp unit 4 includes in a single structure both a lamp 1 and a primary mirror 3 which initially reflects the reflected beam of light form the surface of a document 2 to be copied, and this lamp unit 4 is made slidably adjustable in the directions shown by arrows. When the machine is assembled, the lamp unit 4 is adjusted so that the optical path length represented therein by a+b+c between the conjugate foci can be correctly set.

Figure 3:
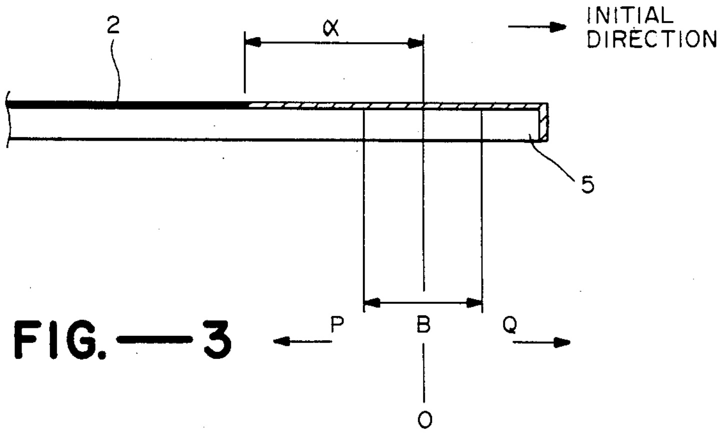

With this method of adjustment whereby only the lamp unit 4 is moved, the distance $\alpha$ traveled by the document carrying table 5 before it reaches a uniform speed may not be constant because the exposure center O shifts within the width $\beta$ of adjustment as shown in FIG. 3. If this distance a is not constant, the speed of the table 5 may not be stable when the front edge of the document 2 reaches the exposure center O and this may cause a blur on the copy. FIGS. 4 and 5 show a method of overcoming this inconvenience by adjusting the table start position, that is, the position at which the motion of the document table 5 starts.

With reference to FIGS. 4 and 5, a table start position detecting switch MS5 for detecting the table start position and a table return position detection switch MS7 for detecting the position where the table reverses its direction of motion are mounted on opposite surfaces of a plate 10 which is affixed to the copying machine housing 9 by means of a screw 11. When the print switch (not shown) is turned on, the table 5 begins to move in the direction of the arrow P until the switch MS5 is turned on. At this moment, the distance between the exposure center O and the front edge of the document is given by $\alpha$ and the table 5 is at the position shown by A in FIG. 5-A. After a predetermined length of time has passed in this condition, the table 5 begins to move in the direction of the arrow Q. Copying is effected during this process. After the table 5 has moved in the direction of Q such that the switch MS7 is switched on, the motion of the table 5 in the direction of Q stops. At this moment, the table 5 is at the position shown by B in FIG. 5-A. As soon as the switch MS7 is turned on, the table 5 begins to move in the direction of P again until it returns to its original position, thus completing a cycle of copying operation. As shown in FIG. 5-B, pieces 7 and 8 for touching the switches are attached to a supporting plate 6 affixed to the table 5. Each switch MS5 and MS7 comprises a microswitch and is switched on when the corresponding touching piece 7 and 8 comes to the end position of its actuator 12 or 13. The plate 10 is provided with an opening 14 for passing the screw 11 therethrough to fasten the plate 10 to the machine housing 9. The opening 14 is elongated as shown in FIG. 4-A in the direction of motion of the table 5 such that the position of the plate 10 can be adjusted by changing the position at which the screw 11 is tightened in the opening 14.

With the structure as described above, the lamp unit 4 is moved in the direction of P when the distance between the conjugate points is set equal to a and the plate 10 is similarly moved in the direction of P and is fastened. If the lamp unit 4 is moved in the direction of Q, the plate 10 is also moved in the direction of Q similarly and is fastened. Variations in the distance $\alpha$ accompanied by the fine adjustment of the lamp unit 4 can thus be eliminated. By this method, however, the table start position cannot be adjusted sufficiently accurately because of adjustment errors of the plate 10 and errors in the dimensions of various mass-produced component parts. Moreover, the method itself is complicated.

It is therefore an object of the present invention to eliminate the problems described above by providing a table start position selecting mechanism for a copying machine of the type with a movable table whereby the adjustment of table start position can be effected easily and more accurately, independent of the adjustment errors relating to the plate for attaching switches or variations in the dimensions of various component parts.

The above and other objects of the present invention are achieved by providing a positioning means to a lamp unit at the center of the optical axis and using this positioning means to position the plate to which the start position detection switch is affixed. With a mechanism according to this invention, the switch-supporting plate needs only to be adjustingly moved according to the displacement of the lamp unit. If it is positioned with respect to the lamp unit and then fastened, adjustment of the table start position is automatically completed. In summary, errors in adjustment of the switch-supporting plate can be reduced and the accuracy of adjustment can be improved. Moreover, the adjustment operation according to the present invention is much simpler.

Figure 1A:
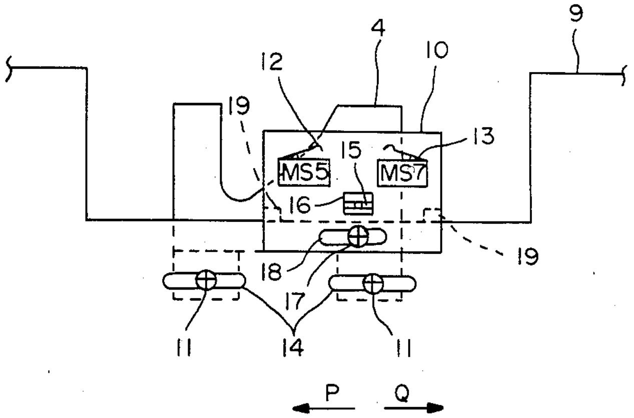
Figure 1B:
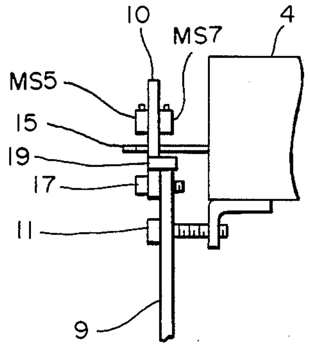
Figure 4A:
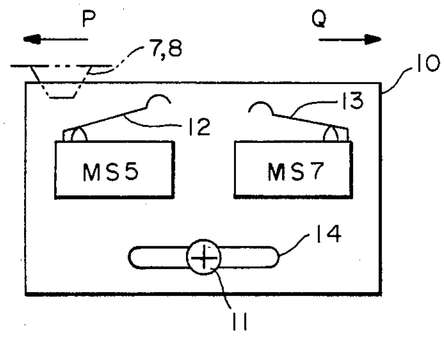
Figure 4B:
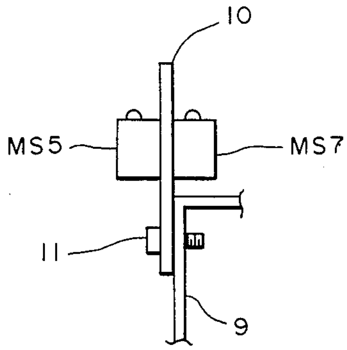
Figure 5A:
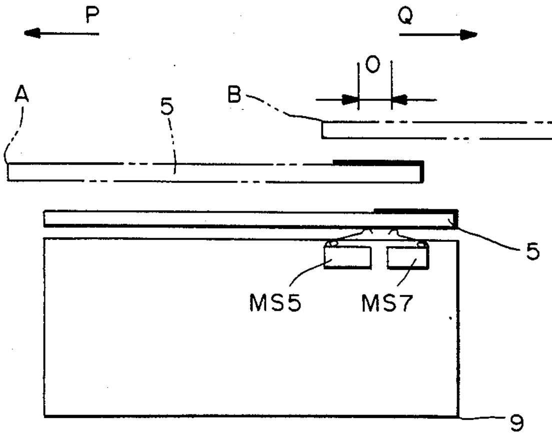
Figure 5B:
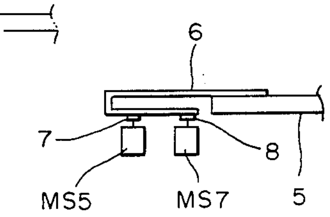

The accompanying drawings, which are incorporated in and form a part of the specification, illustrate one embodiment of the present invention and, together with the description, serve to explain the principles of the invention. In the drawings:

FIG. 1A is a front view of a table start position selecting mechanism embodying the present invention for a copying machine of the type with a movable table, FIG. 1B is a side view of the mechanism of FIG. 1A, FIG. 2 is a drawing for schematically showing the optical system of a copying machine of the type with a movable table, FIG. 3 is a drawing for showing the distance initially traveled by the movable table of a copying machine, FIGS. 4A and 4B are front and side views of a table start position selecting mechanism previously considered for a copying machine of the type with a movable table, FIG. 5A is a drawing for showing the motion of a movable table of a copying machine, and FIG. 5B is a side view of the attachment for switches.

A table start position selecting mechanism for an electrophotographic copying machine embodying the present invention is illustrated in FIG. 1 wherein the same numerals defined above indicate corresponding components. With reference to FIG. 1, the lamp unit 4 is provided with a positioning pin 15 which is at the center of the optical axis and is used for the positioning in the direction of motion of the table. An opening 16 is correspondingly formed in the plate 10 for attaching switches such that the aforementioned pin 15 penetrates therethrough. The plate 10 is further provided with an elongated opening 18 for a screw 17 for affixing the plate 10. Numeral 19 indicates a piece for positioning the plate 10 in a direction perpendicular to the motion of the table.

The relationship between the motion of the table 5 and the switches MS5 and MS7 is the same as explained by way of FIG. 5. When the lamp unit 4 is adjusted in the direction of P or Q according to the characteristics of the lens in the optical system, the pin 15 is so adjusted as to engage in the opening 16 in the plate 10 such that the plate 10 is automatically set at the position to which the lamp unit 4 has been adjusted. If the plate 10 is fastened at this position by using the screw 17, the starting position of the table 5 is accurately and easily adjusted.

The foregoing description of a preferred embodiment of the invention has been presented for purposes of illustration and description. It is not intended to be exhaustive or to limit the invention to the previous form disclosed and obviously many modifications and variations are possible in light of the above teaching. For example, the pin 15 in FIG. 1 may be replaced by a member of any shape which can adequately indicate the position of the optical axis. Such modifications and variations which may be apparent to a person skilled in the art are intended to be included within the scope of this invention.

What is claimed is:

1. A table start position selecting mechanism for a copying machine of the type with a movable document carrying table, said copying machine including a unistructural lamp unit defining an optical axis with a lamp and a primary mirror for initially reflecting light from a document on said table, the position of said lamp unit being adjustable when said copying machine is assembled, said mechanism comprising a switch-supporting plate which is independent of said lamp unit and adjustable with respect thereto in the direction of motion of said table, a table start position detection switch attached to said plate, and a positioning means affixed to said lamp unit at the center of said optical axis for positioning said plate with respect to said lamp unit in the direction of motion of said table.

2. A table start position selecting mechanism for a copying machine of the type with a movable document carrying table, said copying machine including a unistructural lamp unit defining an optical axis with a lamp and a primary mirror for initially reflecting light from a document on said table, the position of said lamp unit being adjustable when said copying machine is assembled, said mechanism comprising a switch-supporting plate which is independent of said lamp unit and adjustable with respect thereto in the direction of motion of said table, a table start position detection switch attached to said plate, and a positioning means affixed to said lamp unit at the center of said optical axis for positioning said plate with respect to said lamp unit in the direction of motion of said table, said positioning means including a pin which protrudes from said lamp unit.

3. The mechanism of claim 2 wherein said plate has a hole for allowing said pin to pass through said plate.

4. The mechanism of claim 2 wherein said pin protrudes perpendicularly to the direction of motion of said table.

5. A table start position selecting mechanism for a copying machine of the type with a movable document carrying table, said copying machine including a unistructural lamp unit defining an optical axis with a lamp and a primary mirror for initially reflecting light from a document on said table, the position of said lamp unit being adjustable when said copying machine is assembled, said mechanism comprising a switch-supporting plate which is independent of said lamp unit and adjustable with respect thereto in the direction of motion of said table, a table start position detection switch attached to said plate, and a positioning means affixed to said lamp unit at the center of said optical axis for positioning said plate with respect to said lamp unit in the direction of motion of said table, said plate having an opening elongated in the direction of motion of said table and being adapted to be fastened to said lamp unit by a screw means passing through said elongated opening.

* * * * *